United States Patent [19]

Bruijns et al.

[11] Patent Number: 5,216,512
[45] Date of Patent: Jun. 1, 1993

[54] IMAGING SYSTEM INCLUDING AN OPTICAL SYSTEM COMPRESSING A CIRCULAR OBJECT PLANE AREA TO AN ELLIPTICAL AREA AT A DETECTION FACE

[75] Inventors: Antonius J. C. Bruijns; Rudolph M. Snoeren; Bartholomeus G. M. H. Dillen, all of Eindhoven, Netherlands

[73] Assignee: U.S. Philips Corp., New York, N.Y.

[21] Appl. No.: 738,394

[22] Filed: Jul. 31, 1991

[30] Foreign Application Priority Data

Feb. 8, 1990 [NL] Netherlands ............................ 9001750

[51] Int. Cl.⁵ ........................ H04N 5/225; H04N 5/30; H01J 3/14; H01J 5/16
[52] U.S. Cl. ...................................... 358/225; 358/209; 250/216
[58] Field of Search ................ 358/211, 219, 225, 209; 250/216

[56] References Cited

U.S. PATENT DOCUMENTS 4,857,724 8/1989 Snoeren ................................. 250/216

FOREIGN PATENT DOCUMENTS 0295728 5/1988 European Pat. Off. .
0419118 3/1991 European Pat. Off. .
8701169 12/1988 Netherlands .

Primary Examiner—Michael T. Razavi
Assistant Examiner—Wendy R. Greening
Attorney, Agent, or Firm—Jack D. Slobod

[57] ABSTRACT

An imaging system includes an image pick-up device with an image sensor having a rectangular detection face which is subdivided into discrete detection sub-faces for converting a radiation intensity distribution on the detection face into an electric signal, the detection sub-faces being arranged in a matrix of n rows and p columns respectively dividing short and long sides of the detection face, an object plane and an optical system which images a radiation intensity distribution in a circle situated in the object plane onto an ellipse situated on the detection face in accordance with a compression factor m. The compression factor may be chosen so that the ellipse spans no more than p/2 columns of the detection face so that video images can be formed at twice the conventional rate. In the case of non-square detection sub-faces, the compression rate may be chosen so that the ellipse spans an equal number of rows and columns, thereby making each detection sub-face correspond to a square in the object plane. When several, mutually shifted image sensors are used, the compression rate of the optical system is adapted to correct a decrease in effective dimension of the detection sub-faces. A CCD sensor is used in an imaging system operating according to the NTSC standard by utilizing correct image compression.

20 Claims, 3 Drawing Sheets

IMAGING SYSTEM INCLUDING AN OPTICAL SYSTEM COMPRESSING A CIRCULAR OBJECT PLANE AREA TO AN ELLIPTICAL AREA AT A DETECTION FACE

FIELD OF THE INVENTION

The invention relates to an imaging system, comprising an image pick-up device provided with an image sensor having a detection face which is subdivided into detection sub-faces for converting a radiation intensity distribution on the detection face into an electric signal, the detection sub-faces being arranged in a matrix of n rows and p columns, an object plane and an optical system which cooperates with the object plane and the image sensor in order to image the object plane on the detection face, and also comprising display means which are connected to the image sensor in order to display the radiation intensity distribution on the detection face, the optical system imaging a circle situated in the object plane as an ellipse when the detection face has a rectangular shape with a long side and a short side.

The invention also relates to an image pick-up device suitable for use in such an imaging system.

BACKGROUND OF THE INVENTION

An imaging system of the kind set forth is known from European Patent Application EP 295,728, now U.S. Pat. No. 4,857,724.

According to the cited patent, a circular exit screen of an image intensifier tube is imaged, via the optical system, as an inscribed ellipse on a rectangular CCD matrix, the long and short axes of the ellipse being equal to the long side and the short side, respectively, of the CCD matrix. Thus, optimum use is made of the detection face of the CCD matrix and the resolution is enhanced in the direction of the long axis of the ellipse. The ellipse can be displayed as a circle again on a display unit by accelerated reading of the detection sub-faces of the CCD matrix in a row direction (video line direction). In addition to an efficient as possible use of the detection face of the image sensor, it is desirable to adapt the number of active detection sub-faces to the display means used which comprise, for example a television picture tube or a digital data processing or data storage device.

When the display means comprise a cathode ray tube, the signals of the detection sub-faces are made visible on a phosphorescent display screen along the image lines. To this end, the charge accumulated, for example, underneath the detection sub-faces in a CCD image sensor of the frame transfer type, is introduced into a shift register in parallel per row of detection sub-faces, the charge being applied from said shift register to the cathode ray tube per detection sub-face. The signal value of a detection sub-face modulates the intensity of an electron beam scanning the display screen and becomes visible as a brightness variation with respect to a dark level on the display screen. The detection sub-faces are thus distributed as if it were across the display screen, the position of the detection sub-faces along an image line and the position of a row of detection sub-faces on the display screen being determined by the frequency at which the detection sub-faces are shifted out of the shift register. The number of rows of detection sub-faces of the image sensor which can be displayed on the display screen is determined by the number of lines constituting the image on the display screen. When the total number of rows of detection sub-faces of the image sensor amounts to n and the number of lines of the display screen of the display means amounts to z, where n > z, not all rows of detection sub-faces can be displayed on the display screen. As a result, image compression of a round image on the image sensor into an elliptical image which covers the surface of the image sensor as well as possible, is of limited use. In such a case the optical system distorts a round image by a compression factor m, m being the ratio of the short axis of the ellipse to the long axis of the ellipse, where m = b/a. Therein, b is the short side of the rectangular detection face and a is the long side, thereof.

SUMMARY OF THE INVENTION

An imaging system in accordance with the invention is characterized in that a short axis of the ellipse is shorter than the short side of the detection face.

An embodiment of an imaging system in accordance with the invention is characterized in that in the case of a long side of the detection face having a length a and a short side of the detection face having a length b, the optical system images a circle situated in the object plane as an ellipse spanning n' rows and p' columns of detection sub-faces, where p' ≤ p (where p is the total number of columns of detection sub-faces of the image sensor) and n' < n, so that for axes k and l of the ellipse:

$$\frac{k}{l} = \frac{b}{a} = \frac{p\,n'}{p'\,n}.$$

When the compression factor m is reduced to $$\frac{b\,n'}{a\,n},$$

n' rows of detection sub-faces can be displayed on a display screen with n' image lines, without interpolation or data reduction being required. An image sensor comprising a large number of rows of detection sub-faces can thus simply cooperate with an image display system with 525 lines as well as with a 625-line image display system. Usually it is desirable not to use all p columns of detection sub-faces of the image sensor but only p' columns so that, for example, in the case of p/p' = 2, the image sensor can form 100 images per second at the same read frequency of the shift register. The imaging system is conventionally operable in a mode where two successive fields from the image sensor form one frame on the display means, the image lines, corresponding to rows of the detection sub-faces, being interlaced 2:1. This is abbreviated as 625/2:1/50. By utilizing the image compression in the horizontal direction to restrict the image to be no wider than p/2 columns of detection sub-faces image display can take place with double the image frequency, abbreviated as 625/2:1/100. When p' columns are used, the compression factor is increased to $$m = \frac{b\,n'\,p}{a\,n\,p'}.$$

A further embodiment of an imaging system in accordance with the invention is characterized in that the number of rows of detection sub-faces n' is equal to the number of columns of detection sub-faces p'.

When the detection sub-faces have an elongate shape, the compression factor of the optical system is advantageously adjusted so that the axes of the ellipse extend along an equal number of detection sub-faces. Because $p'=n'$, the compression factor m becomes $$m = \frac{b\,p}{a\,n}.$$

Using such image compression, a circle situated in the object plane is distributed on the detection face between an equal number of rows and columns of detection sub-faces, so that upon display on a display screen or upon storage in a digital image storage device an image is composed of square image elements. This is advantageous in the case of combination or storage of image information originating from image sensors having detection sub-faces of different shape. In the case of storage of signal values originating from detection sub-faces on, for example, magnetic tape or an optical plate, no additional information need be stored as regards the dimensions of the detection sub-faces. In the case of combination of images originating from image sensors having detection sub-faces of different shape, a matrix of $i \times j$ image elements originating from a first sensor can be combined, without interpolation or decimation, with a matrix of $i \times j$ image elements from a second sensor.

An imaging system in accordance with the invention, comprising an image pick-up device provided with an image sensor having a detection face which is subdivided into detection sub-faces for converting a radiation intensity distribution on the detection face into an electric signal, the detection sub-faces being arranged in a matrix in rows and columns, an object plane and an optical system which cooperates with the object plane and the image sensor in order to image the object plane on the detection face, and also comprising display means which are connected to the image sensor in order to display the radiation intensity distribution on the detection face, the optical system imaging a circle situated in the object plane as an ellipse in the case of a rectangular detection face having a long side and a short side, is characterized in that the image pick-up device comprises a number of t image sensors, each of which comprises detection sub-faces having a dimension x in a row direction and a dimension y in a column direction, t being at least equal to 2, the optical system imaging the ellipse on each of the imaging sensors on n' rows and p' columns, the ellipse being shifted on the respective image sensors over a distance equal to 1/t part of a dimension of a detection sub-face, the axes k and l of the ellipse satisfying $k/l = n'y(p'\,1/tx)$ in the case of a shift in a row direction whilst in the case of a shift in a column direction, the axes k and l of the ellipse satisfy $k/l = (n'y\,1/t)/(p'x)$.

The resolution can be enhanced by using several image sensors on which the object plane is imaged in mutually shifted positions. Because the effective dimension of the detection sub-faces is thus reduced, it is necessary to adapt the optical system in order to produce the correct image compression so that the image sensors can cooperate with the display means in the same way as when one image sensor is used.

An embodiment of an imaging system in accordance with the invention is characterized in that the image sensor comprises a shift register for parallel reception of charges from detection sub-faces situated in a row and for sequential output of charges stored in the shift register to the display means, the shift register being provided, over at least a part of its length, with a reset electrode for applying charges stored in the shift register to a drain.

When the charge of the detection sub-faces which do not contain image information is discharged via the reset electrode, the image sensor will be ready to accept a next image sooner than when all detection sub-faces are read via the shift register. This is important notably for the imaging of fast moving objects, for example pediatric X-ray imaging at a frequency of 100 Hz. As a result of the use of the reset electrode, the image information of each even row of detection sub-faces in a first image of the image sensor can be discharged to the drain and in a second image the image information of every odd row of detection sub-faces can be discharged thereto. The two images successively obtained can be displayed on the television monitor in an interlaced manner. The resolution is thus enhanced in comparison with the resolution obtained in the case of an imaging mode where the image sensor forms a first image with pair-wise combination of neighbouring rows of detection sub-faces (for example, rows 1 and 2, rows 3 and 4, rows 5 and 6, etc.) and where a second image is formed by pair-wise combination of neighbouring rows of detection sub-faces which have been shifted over one row with respect to the first image (for example, rows 2 and 3, rows 4 and 5, rows 6 and 7, etc.).

BRIEF DESCRIPTION OF THE DRAWINGS

Some embodiments of an imaging system in accordance with the invention will be described in detail hereinafter with reference to the accompanying drawing. Therein.

DESCRIPTION OF THE PREFERRED EMBODIMENTS

Figure 1:
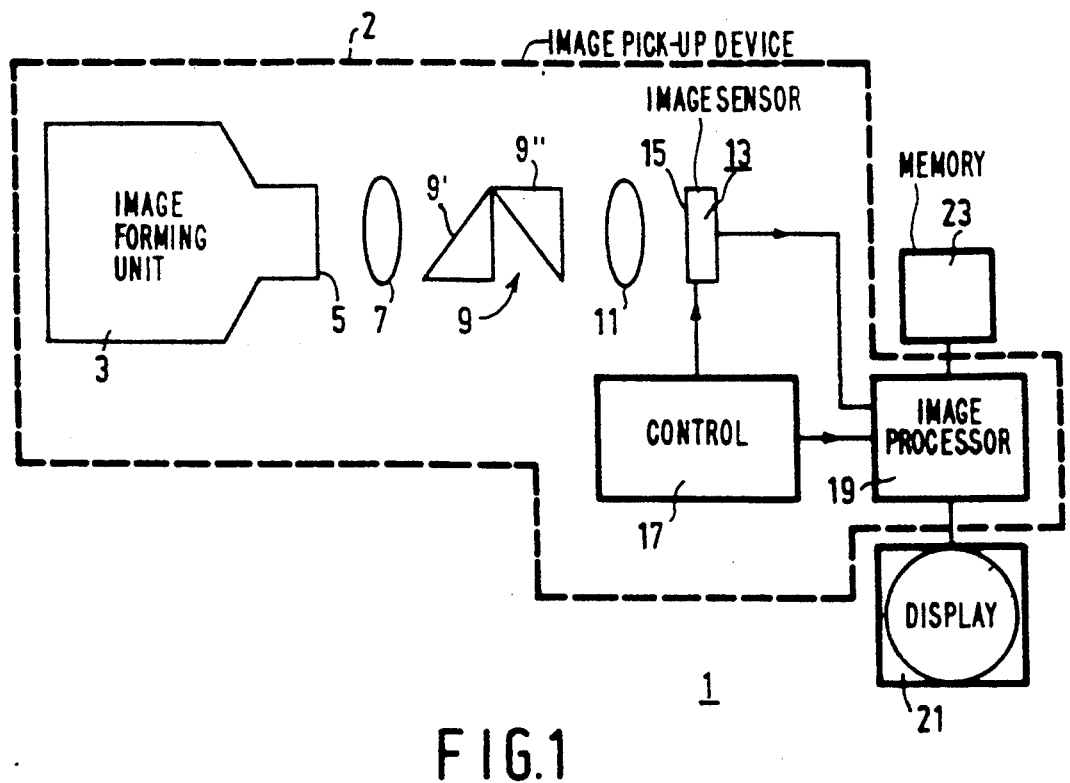
FIG. 1 shows an imaging system in accordance with the invention.

FIG. 1 shows an imaging system, comprising an image pick-up device 2 and display means comprising a display, e.g., monitor, 21 and memory 23. The image pick-up device 2 comprises an image-forming unit 3, for example an image intensifier tube, endoscope or microscope with a circular exit window which forms part of an object plane 5. Via an optical system, comprising a collimating lens 7, an anamorphic prism system 9 and a further lens 11, the circle situated in the object plane 5 is imaged as an ellipse on a detection face 15 of an image sensor 13. The anamorphic system comprises two prisms 9' and 9" in the present embodiment, but can alternatively be formed by a system of cylindrical lenses, cylindrical mirrors or a fibre optical system. The image sensor 13 is, for example, a CCD sensor having a detection face 15 which is subdivided into 585 rows and 1200 columns of detection sub-faces. Via a control unit 17, a charge accumulated underneath the detection sub-faces is read and applied possibly after digital image processing in an image processing device 19, to a television monitor 21 or to an image memory 23.

Figures 2A, 2B:
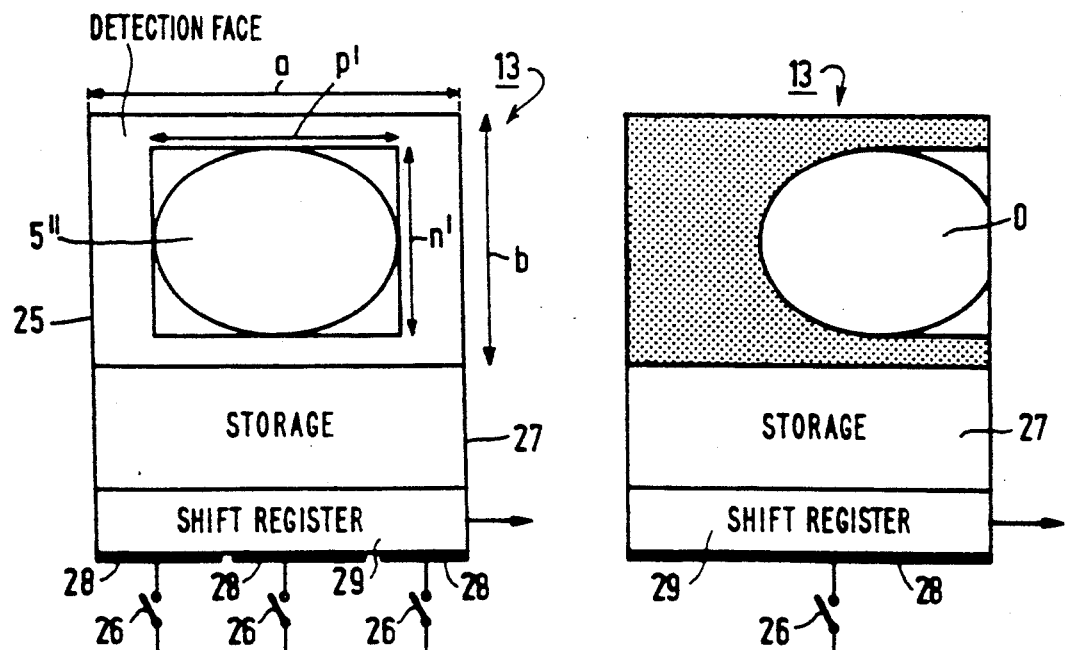
FIG. 2a diagrammatically shows an image sensor.
FIG. 2b shows the detection elements of the image sensor as shown in FIG. 2a, the charge being applied to a drain via a reset electrode.

FIG. 2a shows the image sensor 13, being a frame transfer CCD in the present example, which comprises a photosensitive detection face section 25 and a storage section 27 which is shielded from light. Both sections 25 and 27 comprise, for example, n-type doped channels in a p-type substrate which extend in the vertical direction. Transparent polysilicon electrodes extend over the n-type channels in the horizontal direction, so that at the area where, for example, three electrodes intersect a vertical n-type channel, a detection sub-face is formed having dimensions of, for example, $7.5 \times 11.5$ $\mu m^2$. The photosensitive surface of the image sensor 13 is in the order of magnitude of 60 mm$^2$. When the detection face section 25 is illuminated, positive and negative charge carriers are formed, the negative charge carriers being accumulated underneath the positive electrodes of the detection sub-faces while the positive charge carriers are dissipated to ground via the p-substrate. During a period which is within the flyback period of the television monitor 21, for example, 1.3 ms, the charge is transferred from the detection face 25 to the storage section 27. The control unit 17 then generates voltages across the electrodes of the detection subfaces, the phase of the voltages differing with respect to one another in such a manner that the charge packages accumulated underneath the detection sub-faces move downwards along a column of detection sub-faces. When an image to be displayed on the television monitor 21 is composed of frames which are each formed by two interlaced fields, the storage section 27 need only be half the size of the detection face 25. The charge of neighboring rows of detection sub-faces is then summed in an alternating fashion. Via a shift register 29, the charges are sequentially read per row of detection sub-faces at a frequency which is determined inter alia by the active line time (the time during which an image line is displayed on the television monitor 21) during display. According to the PAL television standard, the active line time amounts to approximately 52 $\mu s$; within this period, 1200 detection sub-faces must be read in the present example, so that a read frequency of read pulses generated by the control unit 17 amounts to 22.5 MHz. In order to adapt the circular exit window of the image-forming unit 3, situated in the object plane 5, to the detection face 15, usually having an aspect ratio b/a equal to $\frac{3}{4}$, in the case of a number of image lines of the television monitor 21 equal to the number of rows of detection sub-faces of the image sensor 13, the optical system comprising lens 7, prism system 9, and lens 11 distorts the round image so as to obtain an elliptical shape. The compression factor m of the optical system then equals $\frac{3}{4}$. When the number of image lines n' on the television monitor 21 is smaller than the number of rows of detection sub-faces n of the image sensor 13, stronger image compression by the optical system is desirable, the compression factor m of the optical system then amounting to $$\frac{b}{a} \frac{n'}{n}.$$

As a result, signals from rows of detection sub-faces need not be decimated for image display. Using an adapted optical system, an image sensor which is suitable for cooperation with display means operating according to the PAL standard and comprising 585 rows of detection sub-faces (n=585) can be made suitable for cooperation with display means operating according to the NTSC standard and requiring only 485 rows of detection sub-faces by application of a compression factor m equal to $$\frac{3}{4} \frac{485}{585} = 0.62.$$

In accordance with the PAL standard used in Europe, an image displayed is composed of 625 image lines, 40 image lines being invisible, and the image frequency is 25 Hz (50 Hz 2:1 interlacing, 625/2:1/50); in accordance with the NTSC standard used in the USA, an image is composed of 525 image lines, 40 image lines of which are invisible, the image frequency being 30 Hz (60 Hz 2:1 interlacing, 525/2:1/60).

The present ellipse 5'' is situated in the center of the detection face 25. However, the ellipse 5'' is preferably imaged so as to be tangent to the lower edge and the side of the detection face 25, so that detection sub-faces which do not contain image information are not read during the reading of the shift register 29. The parts of the shift register 29 which do not contain image information formed by the ellipse 5'' are preferably connected to a reset electrode 28 so that the dark current originating from the non-illuminated parts of the detection face 25 can be drained via the reset electrode. The reset electrode 28 may comprise a number of mutually insulated segments, which number is, for example, equal to the number of detection sub-faces in a row or may be formed by a non-interrupted metallization along the shift register 29 as shown in FIG. 2b. When an ellipse is imaged on the image sensor 13, as shown in FIG. 2b, the charge of the detection sub-faces denoted by a shading can be drained by connection of the reset electrode 28 to the drain by closing a switch 26. Assuming that the period of time required for discharging the charge to the drain is negligibly small, the read time of the sensor is then a factor 0/a.b shorter than the read time of the entire image sensor 13, where 0 is the area of the non-shaded part of the detection face 25 of the image sensor 13 in FIG. 2b.

Figure 3:
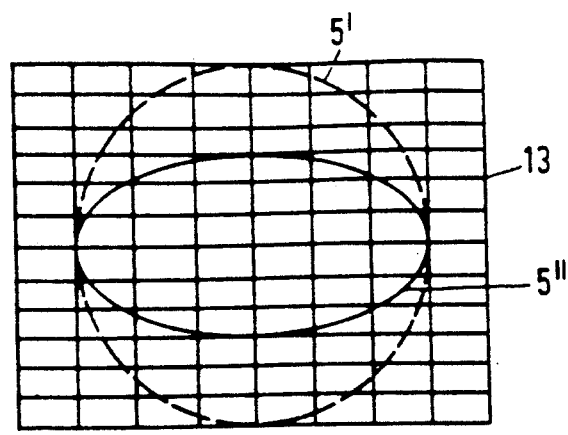
FIGS. 3, 4a and 4b show an image of a circle in the object plane with different degrees of image compression.

FIG. 3 shows an image 5'' of the circular exit window situated in the object plane 5 on an image sensor 13 comprising elongate detection sub-faces when use is made of the optical system having a compression factor m equal to 1. Because of standardization it is desirable to distribute a circular image 5' between an equal number of rows and columns of detection sub-faces, so that for image display or image storage the image displayed or stored is composed of square image elements. This can be achieved by using an optical system having a compression factor m equal to $$\frac{b}{a} \frac{n'}{n} \frac{p}{p'},$$

where p is the total number of columns of detection sub-faces of the sensor 13 and p' is the number of columns used. Another reason for not using all available columns may reside in the read frequency of the detection sub-faces to be used. When the read frequency and the number of rows of detection sub-faces n' to be used are fixed, the number of columns of detection sub-faces to be used is defined so that p' could be unequal to n'. In the example shown in FIG. 3, b/a=$\frac{3}{4}$, p'=n' and n=12 and p=8, so that:

$$m = \frac{3 p}{4 n} = 0.5.$$

When the signals from detection sub-faces on which the ellipse 5" is situated are distributed over a square 6×6 matrix, the non-distorted image 5' is recovered.

Figure 4A:
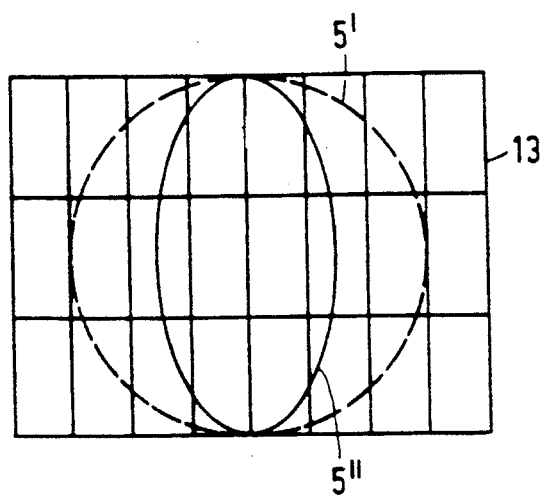
Figure 4B:
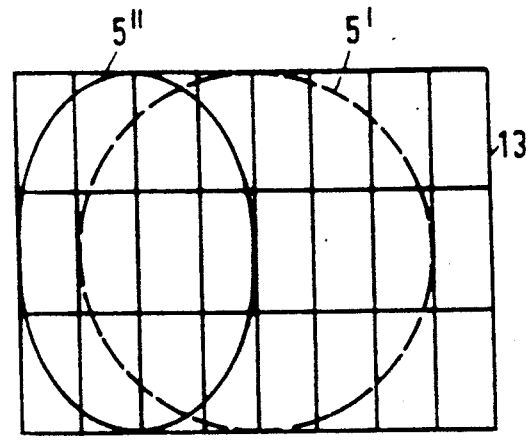

FIG. 4a illustrates a compression where the compression factor m is greater than 1, so that the long axis of the ellipse is shifted 90° with respect to the ellipse obtained in the case of image compression as shown in FIG. 3. In the present example, b/a=$\frac{3}{4}$, p'=n' and n=3, p=8, so m equals 2. An image compression as shown in FIG. 4b, where n'=n and p'=p/2 and the compression factor m=1.5, in combination with a translation of the image to the edge of the image sensor 13, enables the image to be read in half the period of time required for reading the entire surface of the image sensor via the shift register 29. The charge of the detection sub-faces of the image sensor 13 which have not been illuminated is drained via the reset electrode 28 of the shift register 29. As a result, for a constant read frequency fp of the shift register 29, imaging on the photosensitive portion 25 of the image sensor can be twice as fast. Using an image sensor having a read frequency adapted to 50 complete detection faces per second and to imaging according to the 625/2:1/50 format, resulting in a mean read frequency fp=50.n.p, such image compression and image translation enable exposures to be made at 100 Hz because fp=100.n p/2. Thus, at the same read frequency, the image sensor is suitable for imaging according to the 625/2:1/100 format. This is advantageous notably when pediatric X-ray images are formed where irradiation using X-rays with pulses of 100 Hz is desirable for the imaging of comparatively fast moving medical details. The images are stored in the line or image memory 23 and can be applied, after termination of the exposure, to the television monitor 21 with an adapted frequency, so that the circular image 5' is displayed without distortion on the television monitor. The output of the shift register 29 of the image sensor 13 may also be directly connected to a television monitor operating at 100 Hz. Because of a higher illumination intensity on the image sensor 13 for small values of the compression factor, the value of the compression factor m preferably remains smaller than 1 and the image sensor is preferably rotated with respect to the object plane.

Imaging with a frequency of 100 Hz is also used in time sequential stereoscopy. Therein, two mutually shifted X-ray sources produce 100 X-ray images per second which are displayed on a television monitor operating at 100 Hz. The observer of the television monitor then wears spectacles whose glasses are alternately darkened at a frequency of 100 Hz, for example, by means of liquid crystals. Because each eye observes an image at a frequency of 50 Hz, no disturbing image flicker is observed and a steroscopic image is obtained.

Figure 5:
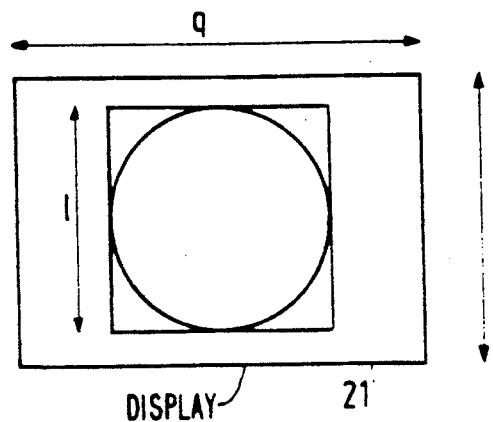
FIG. 5 shows a television monitor with an image of a circle in the object plane.

When a given compression factor is used and the circular image 5' which would appear on the image sensor 13 when using a compression factor m equal to 1 is to be displayed on the television monitor 21 in non-distorted form, the read frequency of the read operation controlled by the control unit should be adapted to the compression factor. FIG. 5 shows the television monitor 21 with a display face having a long side q and a short side r. The circular image 5' of the image sensor, distorted by a compression factor m by the optical system lens 7, prism system 9, and lens 11 so as to form an elliptical image, is displayed as a circle having a diameter 1 by reading the shift register 29 with a read frequency fp. During the active line time $T_1$ of the television monitor, amounting to, for example 52 μs, an image line contains image information only over the length 1. As a result, an effective line time $T_{1e}$ of the television monitor 21 becomes: $T_{1e}=T·1/q$. When a complete image on the television monitor 21 is composed of z image lines, z/r·1 image lines are situated within the length 1 in the vertical direction. This number of image lines is equal to the number of rows of detection sub-faces n' of the image sensor 13, so that: z1/r=n'. The effective line time is thus found:

$$T_{1e} = \frac{T_1 n' r}{q z}.$$

The read frequency fp of the shift register 29 amounts to fp=p'/$T_{1e}$ within the effective line time. Substitution of the previously found effective line time in the latter relation results in a read frequency $$fp = \frac{p' q z}{T_1 n' r}.$$

In combination with the expression for the compression factor $$m = \frac{b n' p}{a n p'}$$

this produces:

$$fp = \frac{k1 \cdot k2}{m}.$$

Therein, $$k1 = \frac{b p}{a n}$$

is an image sensor constant and $$k2 = \frac{q z}{r T_1}$$

is an image display constant.

The read frequency is usually fixed because read frequency synchronization signals for the television monitor must be extracted from the integer factor. By using a correct compression factor, an image sensor having an image sensor constant k1 is capable of cooperating with a television monitor having an image display constant k2. When the compression factor is fixed by the requirement that the number of rows n' and the number of columns p' in an elliptical image 5" on the image sensor 13 must be the same and the read frequency has a given value because of the synchronization requirements imposed, it may be that $$fp \neq \frac{k1\, k2}{m}.$$

Consequently, the circular image 5' is displayed on the television monitor in distorted form. Depending on the importance of the absence of image distortion relative to image composition using square image elements, one of these requirements can be satisfied by adaptation of the compression factor.

Figure 6:
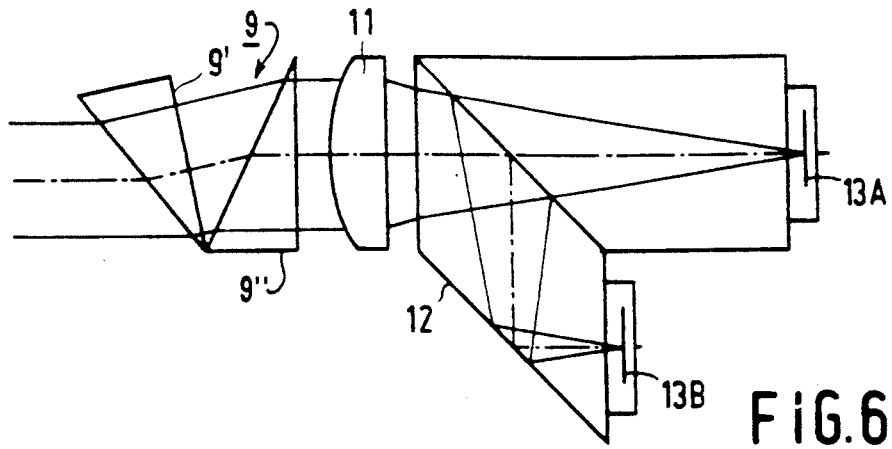
FIG. 6 shows an imaging system for high-resolution imaging using two image sensors.
Figure 7:
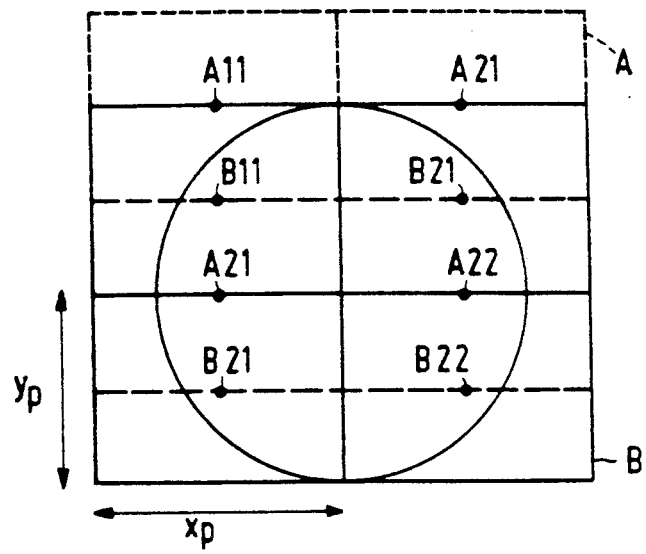
FIG. 7 shows detection sub-faces of two mutually shifted image sensors.

FIG. 6 shows an embodiment of an imaging system comprising a beam splitter 12 which cooperates with the optical system comprising prism system 9, and lens 11 and two image sensors 13A and 13B. The beam splitter 12 images an elliptical image of the circle in the object plane 5 on the respective image sensors 13A and 13B so as to be shifted over a distance amounting to half a detection sub-face. The image resolution is thus doubled in the direction of shift of the two images on the sensors 13A and 13B, for example in the vertical direction. This is illustrated in FIG. 7. An image sensor A, denoted by a broken line in the Figure and comprising four detection sub-faces A11 . . . A22, is shifted over one half detection sub-face in the vertical direction with respect to an image sensor B comprising four detection sub-faces B11 . . . B22. The centers of charge accumulation of the detection sub-faces, being situated in the center of the detection sub-faces, can thus be doubled. When several, mutually shifted image sensors are used, it is necessary to adapt the compression factor of the optical system 7, 9, 11. Generally speaking, the compression factor equals $$m = \frac{b\, n'\, p}{a\, n\, p'},$$

the quotient a/p equals a dimension x of a detection sub-face in the row direction of the image sensor and the quotient b/n equals a dimension y of a detection sub-face in the column direction of the image sensor. The following can be written for the compression factor m:

$$m = \frac{y\, n'}{x\, p'}.$$

When two image sensors which have been shifted with respect to one another in the column direction are used, the effective dimension of a detection sub-face in this direction equals y/2, so that the compression factor is reduced by a factor 2:

$$m = \frac{(y/2)n'}{x\, p'}.$$

In the case of a shift in the row direction amounting to x/2, the compression factor m is increased by a factor 2:

$$m = \frac{y\, n'}{(x/2)p'}.$$

When a plurality of image sensors are used which have been shifted over fractions of a detection sub-face with respect to one another, the compression factor should be adapted in proportion.

Figure 8:
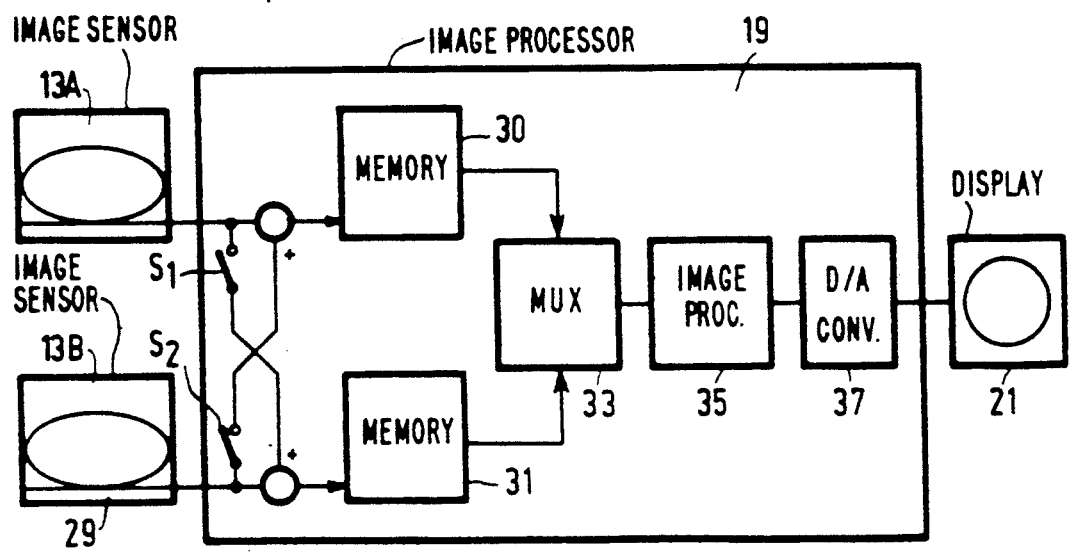
FIG. 8 diagrammatically shows an image processing device for high-resolution images and images formed with a low light intensity.

FIG. 8 shows an embodiment of the image processing device 19 which is connected to two image sensors 13A and 13B. Identical images which have been shifted over one half detection sub-face with respect to one another appear on the detection faces of the image sensors. The signals of the image sensors are simultaneously written into a memory 30 and a memory 31, respectively. Via a multiplexer 33, a row of signals is alternately read from the memory 30 and the memory 31 at a rate which amounts to twice the rate at which the signals of the image sensors 13A and 13B are written into the memories 30 and 31. After electronic image compression in a further image processing unit 35, serving to impart a circular shape to the elliptical image of the object plane 5, the signals are applied, via a digital-to-analog converter, to a television monitor 21 on which an image appears whose resolution amounts to twice the resolution of the individual image sensors 13A and 13B. When the switches S1 and S2 are closed, the signals of the image sensors 13A and 13B are summed. In that case no mutual image shift between the image sensors takes place. An image displayed has the same resolution as the image detected on the image sensors. Such an application is desirable, for example, in fluoroscopy where a low light intensity necessitates integration of the image information in order to obtain a suitable signal-to-noise ratio.

We claim:

1. An imaging system, comprising:
   an image pick-up device including an image sensor having a rectangular detection face which is subdivided into a matrix of rows and columns of detection sub-faces for converting a radiation intensity distribution incident on the detection face into an electrical signal, said detection face having a long side and a short side;
   image forming means for forming a radiation intensity distribution in a circular area of an object plane;
   an optical system which receives radiation from the circular area of the object plane and images the radiation intensity distribution in said circular area of the object plane onto an elliptical area of the detection face, said elliptical area having unequal first and second axes being respectively directed parallel to the short and long sides of the detection face, a shorter one of the first and second axes being shorter than the short side of the detection face; and
   display means connected to the image sensor to display the radiation intensity distribution incident on the detection face.

2. An imaging system as claimed in claim 1 wherein a longer one of the first and second axes of the elliptical area is shorter than the long side of the detection face.

3. An imaging system as claimed in claim 1, wherein the long and short sides of the detection face are of respective lengths a and b, the matrix of detection sub-faces comprises n rows dividing the short side and p columns dividing the long side, the first and second axes of the elliptical area respectively span n' rows and p' columns, and a quotient of lengths of the first and second axes of the elliptical area equals a compression ratio m, where:

$$m = \frac{b\, n'\, p}{a\, n\, p'}$$

p, p', n, and n' are integers greater than 1
p' < p and n' ≦ n.

4. An imaging system as claimed in claim 3, wherein n' = p'.

5. An imaging system as claimed in claim 3, wherein p' ≦ p/2.

6. an imaging system as claimed in claim 1, wherein the second axis of the elliptical area is the shorter one of the first and second axes.

7. An imaging system as claimed in claim 2, wherein the long and short sides of the detection face are of respective lengths a and b, the matrix of detection sub-faces comprises n rows dividing the short side and p columns dividing the long side, the first and second axes of the elliptical area respectively span n' rows and p' columns, and a quotient of lengths of the first and second axes of the elliptical area equals a compression ratio m, where:

$$m = \frac{b\,n'\,p}{a\,n\,p'}$$

p, p', n, and n' are integers greater than 1
p' < p and n' ≦ n.

8. An imaging system as claimed in claim 7, wherein n' = p'.

9. An imaging system as claimed in claim 2, wherein p' ≦ p/2.

10. An imaging system as claimed in claim 6, wherein the long and short sides of the detection face are of respective lengths a and b, the matrix of detection sub-faces comprises n rows dividing the short side and p columns dividing the long side, the first and second axes of the elliptical area respectively span n' rows and p' columns, and a quotient of lengths of the first and second axes of the elliptical area equals a compression ratio m, where:

$$m = \frac{b\,n'\,p}{a\,n\,p'}$$

p, p', n, and n' are integers greater than 1
p' < p and n' ≦ n.

11. An imaging system as claimed in claim 10, wherein n' = p'.

12. An imaging system as claimed in claim 10, wherein p' ≦ p/2.

13. An imaging system as claimed in claim 1, wherein the image sensor comprises a shift register for parallel reception of charges from detection sub-faces situated in a row and for sequential output to the display means of charges stored in the shift register, said shift register including, over at least a portion of its length, a reset electrode for applying charges stored in the shift register to a drain.

14. An imaging system as claimed in claim 1, wherein the optical system comprises an anamorphic system.

15. An imaging system as claimed in claim 1, wherein the image forming means comprises an X-ray intensifier tube having a circular exit window which comprises the circular region of the object plane.

16. An imaging system, comprising:
an image pick-up device including t image sensors, t being an integer ≦ 2, having respective rectangular detection faces, each of which is subdivided into a matrix of n rows and p columns of detection sub-faces, n and p are integers greater than 1, for converting a radiation intensity distribution incident on the detection face into an electrical signal, each detection face having a long side and a short side, and each detection sub-face having a dimension x in a row direction and a dimension y in a column direction;
image forming means for forming a radiation intensity distribution in a circular area of an object plane;
an optical system which receives radiation from the circular area of the object plane and images the radiation intensity distribution in said circular area of the object plane onto elliptical areas of the respective detection faces, which are shifted on the respective detection faces relative to each other in either the row direction or the column direction by 1/t part of the dimension of a sub-face in that direction, each elliptical area having first and second axes respectively directed parallel to the short and long sides of the detection faces; and
display means connected to the t image sensors to display the radiation intensity distribution incident on the detection faces of the t image sensors;
wherein the first and second axes of each elliptical area respectively span n' of the n rows and p' of the p columns of the matrix of detection sub-faces, n' and p' being integers greater than 1, and a quotient of lengths of the first and second axes of each elliptical area equals m, where:

$$m = \frac{y\,n'}{(x/t)\,p'}$$

in the case of said elliptical areas being shifted relative to each other in the row direction, and $$m = \frac{(y/t)\,n'}{x\,p'}$$

in the case of said elliptical areas being shifted relative to each other in the column direction.

17. An imaging system as claimed in claim 16, wherein a shorter one of the first and second axes of the elliptical areas is shorter than the short side of the detection faces.

18. An imaging system as claimed in claim 16, wherein n' = p'.

19. An imaging system as claimed in claim 16, wherein p' ≦ p/2.

20. An imaging system as claimed in claim 17, wherein the second axis of each elliptical area is the shorter one of the first and second axes.

* * * * *